United States Patent
Lambert et al.

(10) Patent No.: US 10,324,878 B1
(45) Date of Patent: Jun. 18, 2019

(54) SYSTEM AND METHOD OF MULTIPLEXING COMMUNICATIONS

(71) Applicant: Dell Products L.P., Round Rock, TX (US)

(72) Inventors: Timothy M. Lambert, Austin, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/035,194

(22) Filed: Jul. 13, 2018

(51) Int. Cl.
| | |
|---|---|
| *G06F 13/38* | (2006.01) |
| *G06F 13/40* | (2006.01) |
| *H04L 12/935* | (2013.01) |
| *G06F 1/3203* | (2019.01) |
| *G06F 9/445* | (2018.01) |

(52) U.S. Cl.
CPC .......... *G06F 13/385* (2013.01); *G06F 1/3203* (2013.01); *G06F 9/44505* (2013.01); *G06F 13/4063* (2013.01); *H04L 49/30* (2013.01); *H04Q 2213/396* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,977,821 B2 * | 12/2005 | Aguinaga, Jr. | ........ | H01R 12/52 361/788 |
| 6,983,338 B2 * | 1/2006 | Hadba | .................... | H01R 31/06 710/11 |
| 7,085,875 B1 * | 8/2006 | Yona | ...................... | G06F 13/409 370/233 |
| 7,484,084 B1 * | 1/2009 | Ranaweera | ............. | G06F 8/656 713/1 |
| 7,580,409 B1 * | 8/2009 | Swenson | ............... | H04L 49/253 370/392 |
| 2012/0042307 A1 * | 2/2012 | Shao | ........................ | G06F 8/654 717/168 |
| 2013/0271904 A1 * | 10/2013 | Hormuth | .............. | H05K 7/1492 361/679.02 |
| 2015/0067226 A1 * | 3/2015 | Iskandar | ............. | G06F 13/4031 710/309 |
| 2017/0180216 A1 * | 6/2017 | Peng | ........................ | H04L 41/24 |
| 2017/0344294 A1 * | 11/2017 | Mishra | .................. | G06F 3/0622 |
| 2018/0032462 A1 * | 2/2018 | Olarig | ................. | G06F 13/4022 |

(Continued)

*Primary Examiner* — Raymond N Phan
(74) *Attorney, Agent, or Firm* — Baker Botts L.L.P.

(57) ABSTRACT

In one or more embodiments, one or more systems, methods, and/or processes may detect commencement signals from respective backplanes. For each backplane of the backplanes, the one or more systems, methods, and/or processes may further configure a multiplexer to select a coupling associated with the backplane; may further provide, via a serial interface and the multiplexer, first information to the backplane; may further receive, via the serial interface, second information from the backplane; may further store the second information from the backplane; may further provide at least a portion of the second information to at least one of information handling system firmware, an operating system, and a boot management controller; and may further boot the operating system with the at least the portion of the second information associated with at least one of the backplanes.

20 Claims, 6 Drawing Sheets

(56) References Cited

U.S. PATENT DOCUMENTS

2018/0059742 A1\* 3/2018 Jenkins ............... H05K 7/1459
2018/0074984 A1\* 3/2018 Olarig ................. G06F 13/36
2018/0285019 A1\* 10/2018 Olarig ................ G06F 3/0655

\* cited by examiner

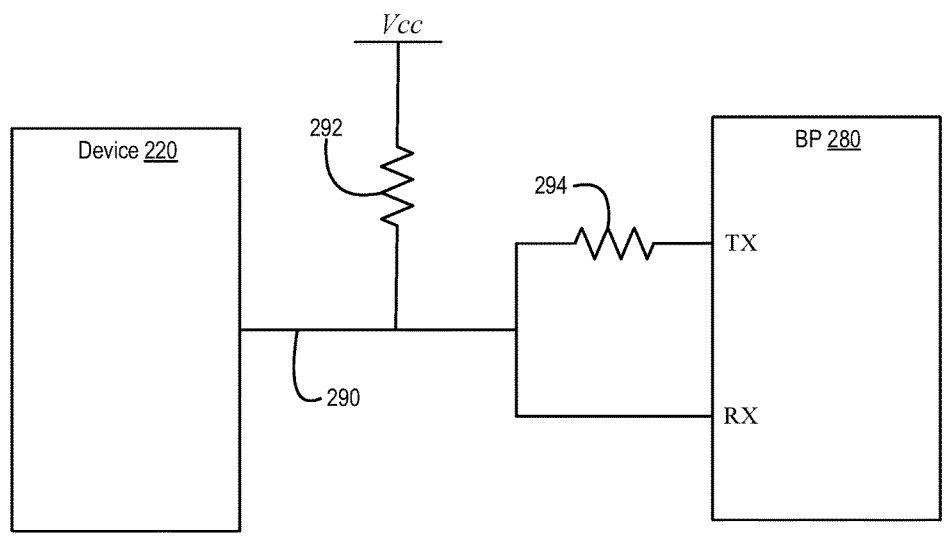
FIG. 2C
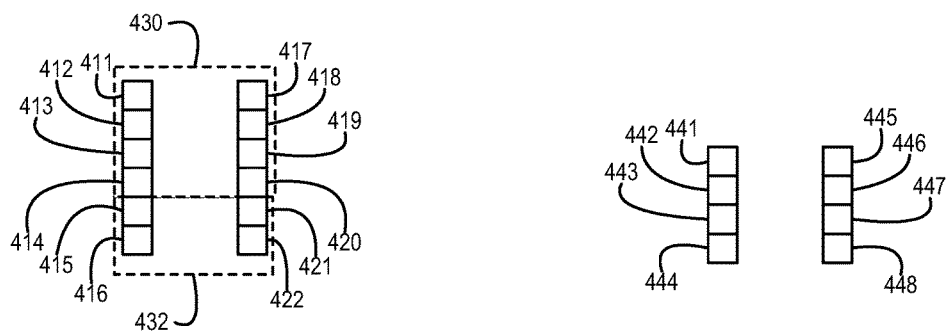
FIG. 4A
FIG. 4B

SYSTEM AND METHOD OF MULTIPLEXING COMMUNICATIONS

BACKGROUND

Field of the Disclosure

This disclosure relates generally to information handling systems and more particularly to multiplexing communications associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may detect commencement signals from respective backplanes. For each backplane of the backplanes, the one or more systems, methods, and/or processes may further configure a first multiplexer to select a coupling associated with the backplane; may further provide, via a serial interface and the first multiplexer, first information to the backplane; may further receive, via the serial interface, second information from the backplane; may further store the second information from the backplane; may further provide at least a portion of the second information to at least one of information handling system firmware, an operating system, and a boot management controller; and may further boot the operating system with the at least the portion of the second information associated with at least one of the backplanes.

In one or more embodiments, the boot management controller may be configured to provide the at least the portion of the second information associated with at least one of the backplanes to the operating system. In one or more embodiments, the operating system may include a management information exchange that may include at least one of a Windows Management Interface (WMI) and a Common Information Model (CIM), among others. In one or more embodiments, booting the operating system with the at least the portion of the second information associated with at least one of the backplanes may include receiving, via the at least one of the WMI and the CIM, the at least the portion of the second information associated with at least one of the backplanes from the information handling system firmware.

In one or more embodiments, the second information from the backplane may include an inventory associated with the backplane. For example, the one or more systems, methods, and/or processes may further configure at least one serializer/deserializer port based at least on the inventory associated with the backplane. For instance, the at least one serializer/deserializer port may be coupled to a processor of an information handling system. In one or more embodiments, receiving, via the serial interface, the second information from the backplane may include receiving, via a second multiplexer, the second information from the backplane.

In one or more embodiments, detecting the commencement signals from the backplanes may include detecting RS-232 compliant break sequences from the backplanes. In one or more embodiments, the serial interface may be compliant with a universal asynchronous receiver-transmitter. In one or more embodiments, the at least the portion of the second information associated with the at least one of the backplanes may include configuration information associated with buses of the at least one of the backplanes. For example, booting the operating system with the at least the portion of the second information associated with the at least one of the backplanes, may include configuring the operating system to utilize the configuration information associated with the buses of the at least one of the backplanes.

In one or more embodiments, the one or more systems, methods, and/or processes may further configure a first multiplexer to select a coupling associated with a first backplane of the backplanes; may further provide, via the serial interface and the first multiplexer, third information to the first backplane; may further configure the first multiplexer to select a coupling associated with a second backplane of the backplanes; and may further provide, via the serial interface and the first multiplexer, fourth information to the second backplane. For example, the first backplane and the second backplane may be associated with a storage array. In one instance, the third information may indicate that the first backplane will produce light emissions associated with a storage device of the first backplane. In another instance, the fourth information may indicate that the second backplane will produce light emissions associated with a storage device of the second backplane.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 2C illustrates an example of a device coupled to a backplane, according to one or more embodiments;

FIG. 4A illustrates an example schematic of a socket, according to one or more embodiments;

FIG. 4B illustrates another example schematic of a socket, according to one or more embodiments.

DETAILED DESCRIPTION

Figure 1:
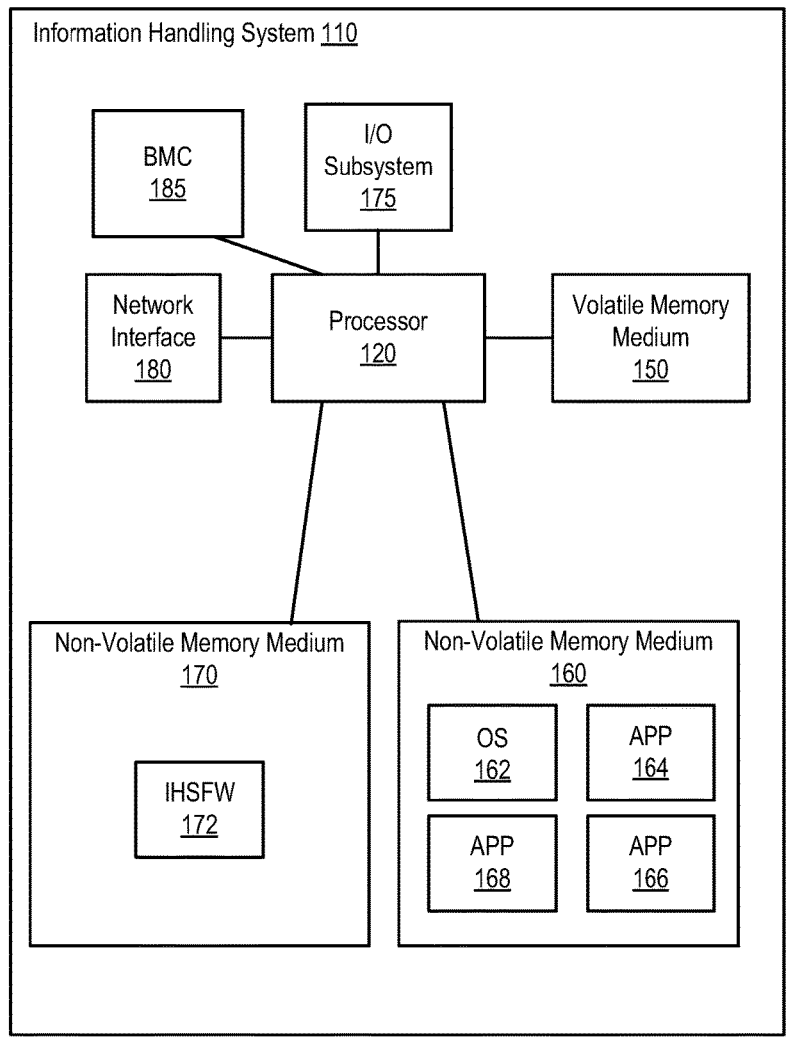
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more communications and/or one or more communications systems may be serialized. For example, serializing one or more communications and/or one or more communications systems may reduce one or more complexities associated with information handling systems. In one or more embodiments, one wire serial communications may be utilized. For example, one wire serial communications may be utilized with each backplane of one or more backplanes associated with an information handling system. In one or more embodiments, a single serial interface may be utilized with communications with multiple backplanes. In one example, the single serial interface may be utilized in communicating with a single backplane of the multiple backplanes. For instance, the single serial interface may be utilized in communicating with each of the multiple backplanes via a multiplexer. In another example, the single serial interface may be utilized in providing information to a first backplane via a first multiplexer while receiving information from a second backplane via a second multiplexer.

In one or more embodiments, a backplane may include a micro controller. For example, the micro controller may include a serial interface. For instance, transmit and receive pins of the serial interface of the micro controller may be coupled together. In one or more embodiments, coupling the transmit and receive pins of the serial interface of the micro controller may be utilized in implementing one wire communications for the backplane. In one or more embodiments, a device may implement a single serial interface and communicate with multiple backplanes via one or more multiplexers. For example, the device may determine an inventory of a backplane via one wire serial communications. In one instance, the device may provide the inventory to information handling system firmware. In another instance, the device may provide the inventory to a boot management controller. In one or more embodiments, the boot management controller may not directly acquire an inventory of a backplane. For example, the boot management controller may receive an inventory of a backplane from the device. In one instance, the device determining the inventory may remove a delay from the boot management controller. In another instance, the device determining the inventory may remove availability dependencies for time critical handshakes between a motherboard and peripheral cards such as enabling information handling system firmware to configure flexible input/output.

In one or more embodiments, the device may acquire an inventory of a backplane when the backplane is hot-plugged. In one or more embodiments, the device may acquire an inventory of a backplane when the backplane coupled to an information handling system operating in an auxiliary power mode. In one or more embodiments, the device may receive a commencement signal from a backplane. For example, the commencement signal may be or include a break signal. For instance, the break signal may be a RS-232 compliant break signal. In one or more embodiments, the device may configure a multiplexer such that a serial interface may communicate with the backplane that provided the break signal. In one or more embodiments, the device may utilize a state machine. For example, if a break signal is received from a backplane, the state machine may add the backplane to a scan list. For instance, the state machine may configure the multiplexer to communicate with a backplane that is in the scan list. In one or more embodiments, some multiplexer configurations may be skipped. For example, a break signal may not have been received from one or more associated multiplexer configurations.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a boot management controller (BMC) 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2A:
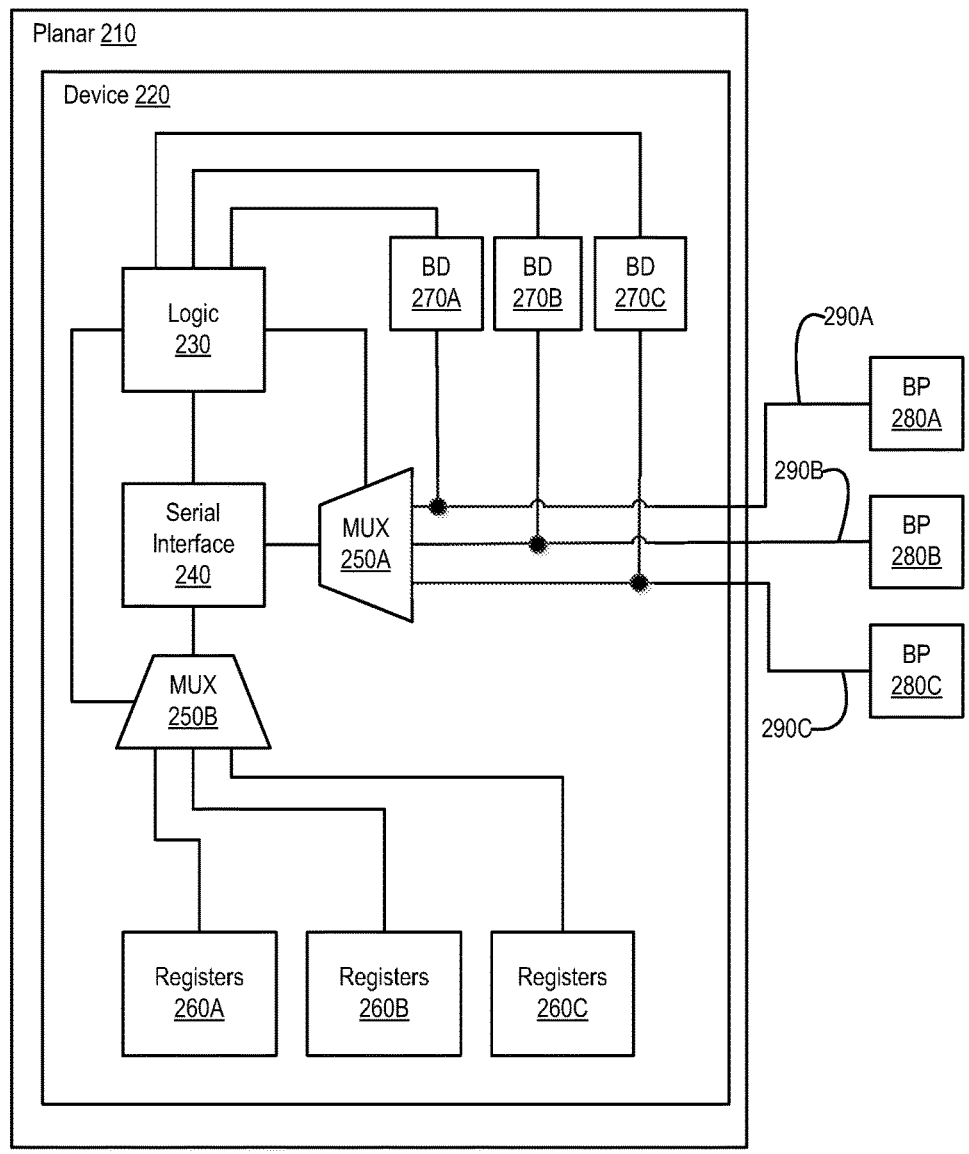
FIG. 2A illustrates an example of a device that communicates with multiple backplanes, according to one or more embodiments.

Turning now to FIG. 2A, an example of a device that communicates with multiple backplanes is illustrated, according to one or more embodiments. As shown, a planar 210 may include a device 220. In one or more embodiments, planar 210 may be or include a motherboard. For example, one or more components of IHS 110 may be installed on planar 210. For instance, IHS 110 may include planar 210. In one or more embodiments, device 220 may be or include a programmable logic device. In one example, device 220 may be or include a FPGA. In another example, device 220 may be or include a complex programmable logic device (CPLD). For instance, a CPLD may include one or more structures and/or functionalities of a FPGA and/or one or more structures and/or functionalities of a programmable array logic (PAL), among others. In one or more embodiments, device 220 may be or include an ASIC. In one or more embodiments, device 220 may be configured to implement one or more systems, one or more flowcharts, one or more methods, and/or one or more processes described herein.

As illustrated, device 220 may include logic 230, a serial interface 240, multiplexers (MUXes) 250A and 250B, registers 260A-260C, and break detectors (BDs) 270A-270C. In one or more embodiments, one or more of logic 230, serial interface 240, MUXes 250A and 250B, registers 260A-260C, and BDs 270A-270C, among others, may be implemented via programmable logic. As shown, backplanes 280A-280C may be coupled to device 220 via respective couplings 290A-290C. Although FIG. 2A illustrates three backplanes, any number of backplanes may be utilized, according to one or more embodiments. In one or more embodiments, a coupling 290 may be or include a one wire interface. For example, a one wire interface may utilize a single conductor to provide information and to receive information. In one or more embodiments, a coupling 290 may be pulled high via a pull up resistor. For example, a backplane (BP) 280 may indicate a break via pulling a respective coupling 290 low. For instance, BPs 280A-280C may signal respective breaks via pulling respective couplings 290A-290C low.

In one or more embodiments, a BP 280 may be or include a storage backplane. In one example, a storage backplane may be or include a non-volatile memory express (NVMe) device, a SATA device, or a SAS device, among others. In another example, a storage backplane may include one or more NVMe devices, one or more SATA devices, and/or one or more SAS devices, among others. In one or more embodiments, a BP 280 may be or include a storage array. In one or more embodiments, a BP 280 may be or include a riser. For example, a riser may be or include a PCIe riser. For example, a PCIe riser may include one or more PCIe slots that may be utilized to interface with one or more PICe devices. As illustrated, BPs 280A-280C may be coupled to multiplexer (MUX) 250A via respective couplings 290A-290C. In one or more embodiments, logic 230 may control MUX 250A. For example, MUX 250A may be utilized to couple a BP 280 of BPs 280A-280C to serial interface 240. For instance, serial interface 240 and a BP 280 of BPs 280A-280C may communicate via MUX 250A. In one or more embodiments, serial interface 240 may implement and/or may be compliant with a universal asynchronous receiver-transmitter (UART). Although not specifically illustrated, serial interface 240 may include one or more transmit buffers and/or one or more receive buffers, according to one or more embodiments.

As shown, a break detector (BD) 270 may be coupled to a coupling 290. In one or more embodiments, a BD 270 may determine if a break is signaled via a coupling 290. For example, determining if a break is signaled via a coupling 290 may include determining a width of a pulse. In one instance, a BD 270 may determine if a RS-232 compliant break sequence is signaled. In another instance, a BD 270 may determine a break has been signaled by determining if a coupling 290 has been pulled to ground for an amount of time. If a break is signaled via coupling 290, BD 270 may provide a signal to logic 230. For example, the signal provided to logic 230 may indicate that a break was detected. In one instance, a break may indicate that a BP 280 is available. In another instance, a break may indicated that a BP 280 has information to provide to device 220.

In one or more embodiments, logic 230 may control MUX 250B. For example, MUX 250B may be utilized to couple serial interface 240 to registers 260. For instance, MUX 250B may be utilized to communicate information from serial interface 240 to registers 260 of registers 260A-260C. In one or more embodiments, registers 260 may be utilized to store information associated with a BP 280. For example, registers 260A-260C may store information associated with BPs 280A-280C, respectively. In one or more embodiments, logic 230 may provide information one or more of BPs 280A-280C. For example, logic 230 providing information a BP 280 may include providing a signal to MUX 250A to select a specific BP 280 and may include providing information, via serial interface 240 and coupling 290 (e.g., a coupling 290 selected via MUX 250A), to the specific BP 280. In one instance, the information provided to the specific BP 280 may include one or more queries. In another instance, the information provided to the specific BP 280 may include one or more instructions.

In one or more embodiments, device 220 may provide information stored via registers 260A-260C to one or more of IHSFW 172, BMC 185, and OS 162, among others. For example, providing information stored via registers 260A-260C to one or more of IHSFW 172, BMC 185, and OS 162, among others, may abate or mitigate one or more amounts of time that one or more of IHSFW 172, BMC 185, and OS 162, among others, may utilize in retrieving information from one or more of BPs 280A-280C, among others. For instance, abating or mitigating one or more amounts of time that one or more of IHSFW 172, BMC 185, and OS 162, among others, may utilize in retrieving information from one or more of BPs 280A-280C, among others, may permit and/or allow IHS 110 to boot faster than it would if one or more of IHSFW 172, BMC 185, and OS 162, among others, retrieved information from one or more of BPs 280A-280C, among others. In one or more embodiments, if IHS 110 boots faster, IHS 110 may process more information in an amount of time transpiring.

In one or more embodiments, device 220 may provide command information and/or configuration information to a BP 280. For example, a BP 280 may be included in a storage array. For instance, a BP 280 may include multiple storage devices that may be utilized in a redundant array of independent disks (RAID). In one or more embodiments, device 220 may receive command information from one or more of OS 162, APP 164, and IHSFW 172, among others, and may provide the command information to BP 280. For example, the command information may include instructions for BP 280 to produce light emissions. For instance, BP 280 may produce light emissions associated with a storage device of BP 280. In one or more embodiments, BP 280 may include one or more light emitting diodes (LEDs) that may produce light emissions. For example, the one or more LEDs of BP 280 may produce light emissions based at least on the command information.

Figure 2B:
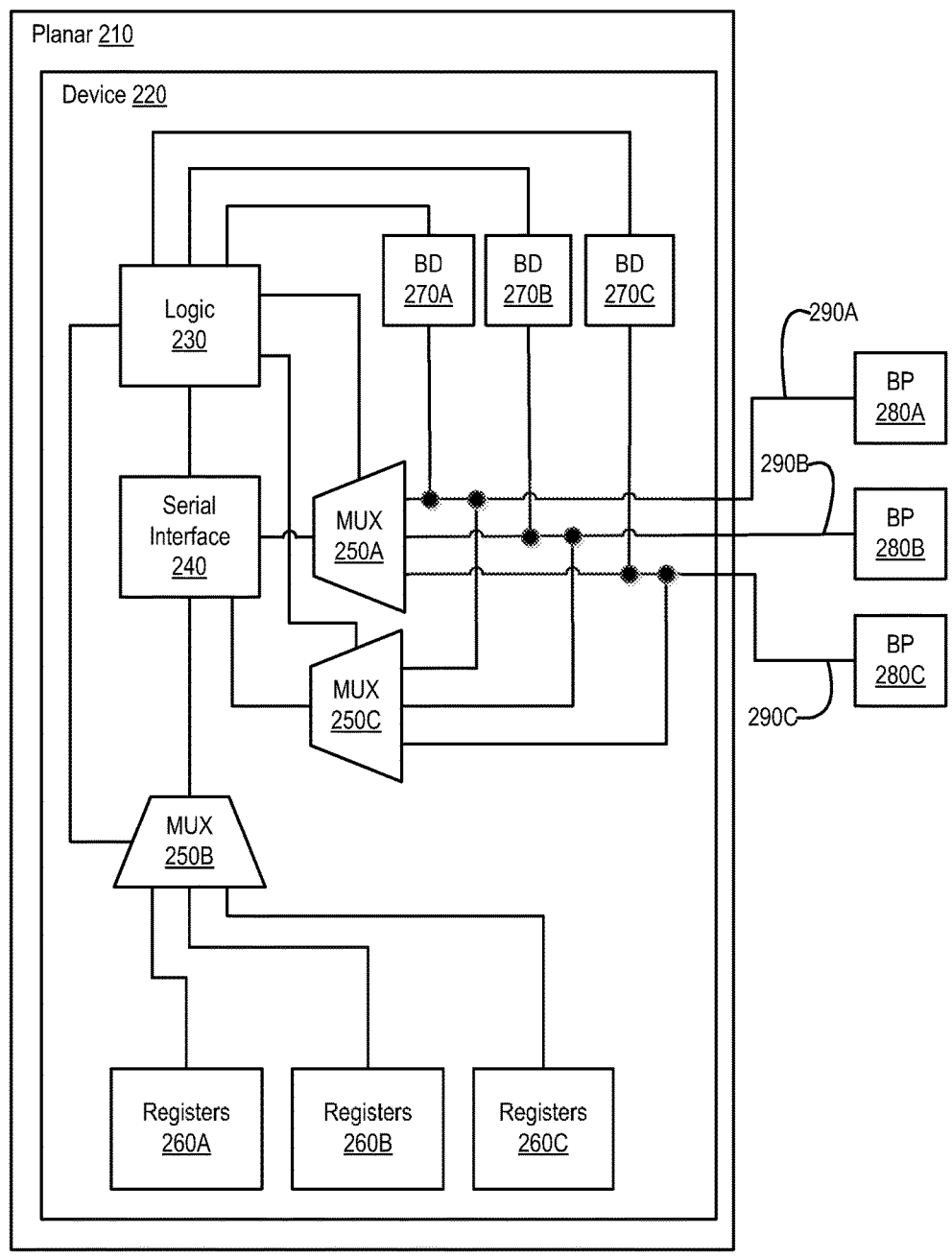
FIG. 2B illustrates another example of a device that communicates with multiple backplanes, according to one or more embodiments.

Turning now to FIG. 2B, another example of a device that communicates with multiple backplanes is illustrated, according to one or more embodiments. As shown, device 220 may include MUX 250C. In one or more embodiments, MUX 250C may be implemented via programmable logic. As illustrated, MUX 250C may be coupled to logic 230 and serial interface 240. As shown, backplanes 280A-280C may be coupled to MUX 250C via respective couplings 290A-290C. In one or more embodiments, logic 230 may control MUX 250C. For example, MUX 250C may be utilized to couple a BP 280 of BPs 280A-280C to serial interface 240. For instance, serial interface 240 and a BP 280 of BPs 280A-280C may communicate via MUX 250C.

In one or more embodiments, utilizing multiple multiplexers may permit and/or allow an increase in communications with multiple backplanes. For example, first information may be provided to a first backplane via a first multiplexer, and a response from the first backplane may be received via a second multiplexer while second information may be provide to a second backplane via the first multiplexer. In one or more embodiments, MUX 250A may be utilized to provide information to a BP 280 of BPs 280A-280C, and MUX 250C may be utilized to receive information from a BP 280 of BPs 280A-280C. For example, serial interface 240 may provide first information to a first BP via MUX 250A, and serial interface 240 may receive second information from the first BP via MUX 250C. For instance, serial interface 240 may provide third information to a second BP via MUX 250A, while serial interface 240 may receive the second information from the first BP via MUX 250C.

Turning now to FIG. 2C, an example of a device coupled to a backplane is illustrated, according to one or more embodiments. As shown, device 220 may be coupled to BP 280 via coupling 290. As illustrated, coupling 290 may be pulled high with a pull up resistor 292. In one or more embodiments, BP 280 may include transmit (TX) and receive (RX) interfaces. For example, BP 280 may include a serial interface that may include TX and RX interfaces. For instance, BP 280 may include a microcontroller that may include the serial interface. In one or more embodiments, the serial interface of BP 280 may implement and/or be compliant with a UART. As shown, RX interface may be coupled to coupling 290. As illustrated, TX interface may be coupled to coupling 290 via a resistor 294.

Figure 3:
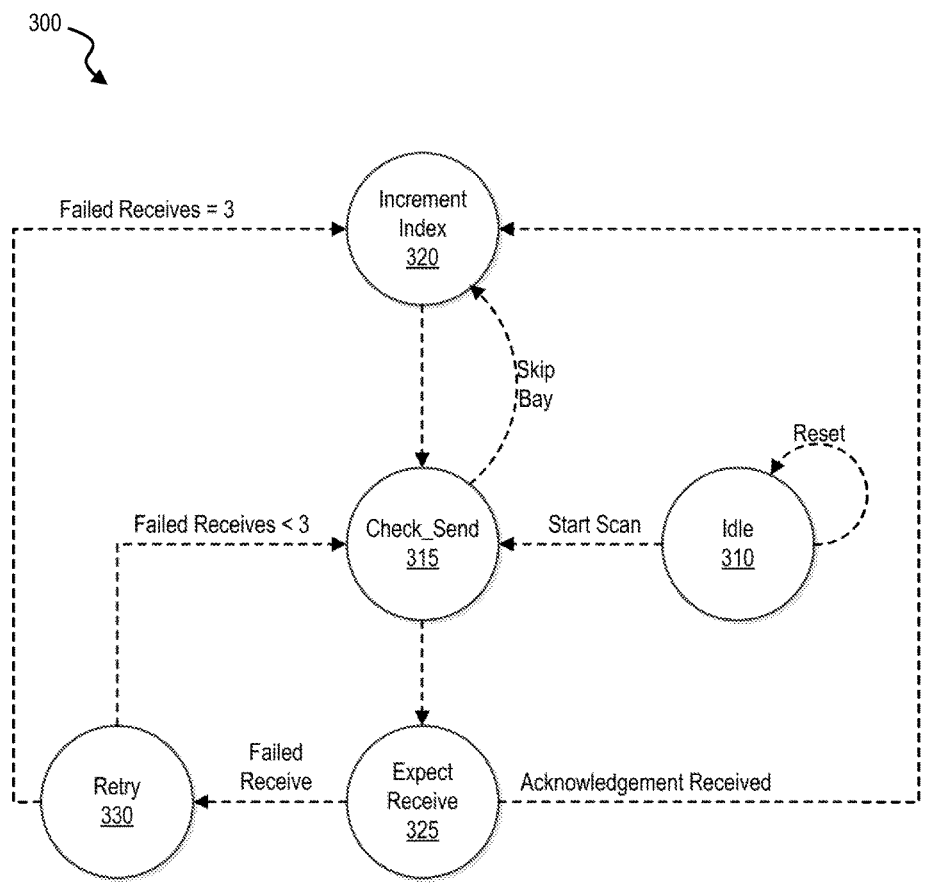
FIG. 3 illustrates an example of a state machine, according to one or more embodiments.

Turning now to FIG. 3, an example of a state machine is illustrated, according to one or more embodiments. In one or more embodiments, a state machine 300 may start with an Idle state 310. When a scan starts, state machine 300 may transition to a Check_Send state 315. In one or more embodiments, in state 315, a current bay index may be checked against flags to determine if a command should be sent. In one example, the current bay index may be associated with BP 280B, and if the flag indicate that BP 280B is unresponsive (e.g., malfunctioning, failed, not present, etc.), a command may not be sent to BP 280B. In another example, the current bay index may be associated with BP 280C, and if the flag indicate that BP 280C is responsive, a command may be sent to BP 280C.

If the flags indicate that a BP is not responsive, the BP may be skipped, and state machine 300 may transition to a state 320. At state 320, an index associated with the BP may be incremented. If the flags indicate that a BP is responsive, state machine 300 may transition to a state 325, where information may be expected to be received. In one or more embodiments, information may be expected to be received within an amount of time transpiring. For example, if information is not received within an amount of time transpiring, state machine 300 may transition to a state 330, a retry count may be incremented. For instance, the retry count may be associated with a bay index. If the retry count is less than three retries, state machine 300 may transition to state 315. If the retry count is three retries, state machine 300 may transition to state 320. At state 315, if the retry count is greater than or equal to three retries, the bay may be skipped, and state machine 300 may transition to state 320. In one or more embodiments, device 220 may implement state machine 300. For example, logic 230 may implement state machine 300.

Turning now to FIG. 4A, an example schematic of a socket is illustrated, according to one or more embodiments. As shown, a socket may include multiple positions 411-422. In one or more embodiments, positions 411-414 and 417-420 may be utilized with a graphics processing unit (GPU). For example, one or more position of the socket may provide power to the GPU. In one or more embodiments, if a GPU is utilizing the socket, a position of the socket may be grounded. For example, IHS 110 may determine if the GPU is present if the position of the socket is grounded. For instance, IHS 110 may determine if the GPU is present if position 418 is grounded. In one or more embodiments, position 418 may be pulled high. For example, position 418 may be pulled high via a pull up resistor. In one or more embodiments, the GPU may utilize a connector that utilizes position grouping 430.

In one or more embodiments, a backplane may be coupled to the socket. For example, a BP 280 may be coupled to the socket. In one or more embodiments, a position of the socket may utilized as coupling 290. For example, position 418 may be utilized with coupling 290. For instance, position 418 may be utilized in a conductive path of coupling 290. In one or more embodiments, serial data between BP 280 and device 220 may occur via position 418. In one or more embodiments, BP 280 may utilize other positions of the socket. For example, BP 280 may utilize positions 415, 416, 421 and 422 of position grouping 432. In one instance, position 416 may provide auxiliary power to BP 280. In another instance, positions 421 and 422 may provide an I²C interface to BP 280.

Turning now to FIG. 4B, another example schematic of a socket is illustrated, according to one or more embodiments. As shown, a socket may include positions 441-448. In one or more embodiments, positions 441-443 may provide power. In one or more embodiments, positions 444, 445, 447, and 448 may provide a ground. In one or more embodiments, position 446 may be utilized with coupling 290. For example, position 446 may be utilized in a conductive path of coupling 290. For instance, serial data between BP 280 and device 220 may occur via position 446. In one or more embodiments, position 446 may be pulled high. For example, position 446 may be pulled high via a pull up resistor.

In one or more embodiments, the socket illustrated in FIG. 4B may provide power to a GPU or to a backplane. In one example, the GPU may pull position 446 to ground. For instance, pulling position 446 to ground may indicate to IHS 110 that the GPU is present. In another example, position 446 may be utilized in serial communication between BP 280 and device 220. For instance, BP 280 may issue a break sequence via position 446, which may notify device 220 that BP 280 is present. In one or more embodiments, utilizing the socket illustrated in FIG. 4B, rather than the socket illustrated in FIG. 4A, may reduce one or more complexities of IHS 110. In one or more embodiments, reducing one or more complexities of IHS 110 may improve one or more operations of IHS 110.

Figure 5:
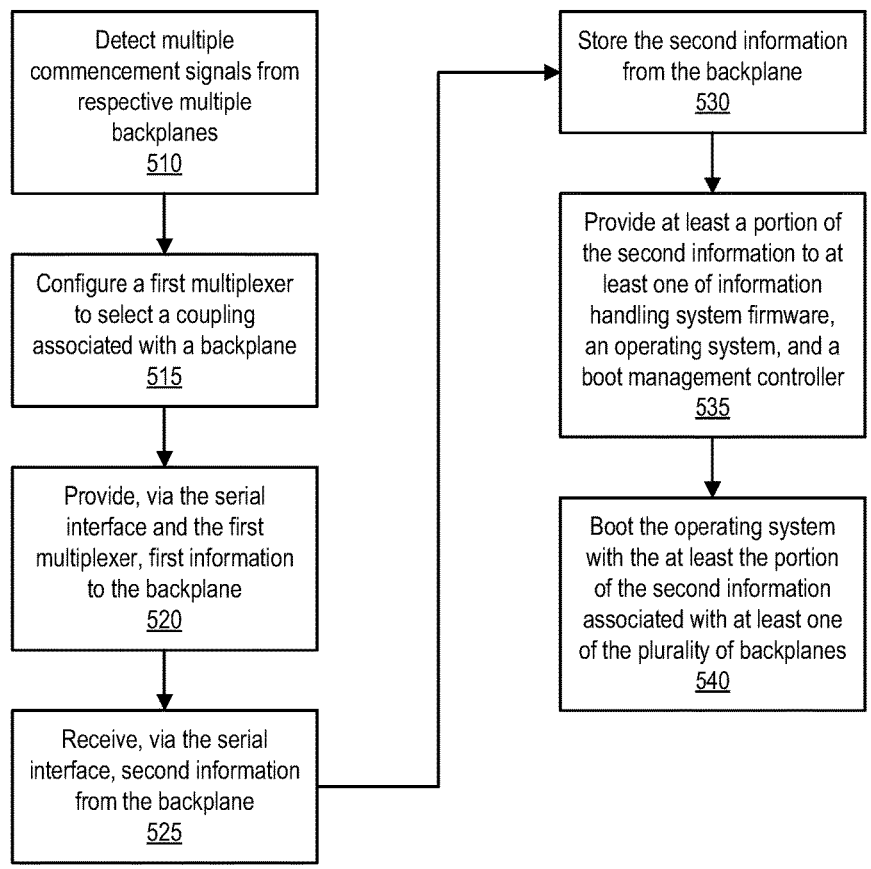
FIG. 5 illustrates an example of a method, according to one or more embodiments.

Turning now to FIG. 5, an example of a method is illustrated, according to one or more embodiments. At 510, multiple commencement signals may be detected from respective multiple backplanes. For example, device 220 may detect multiple commencement signals from respective multiple of BPs 280A-280C. In one or more embodiments, a commencement signal may be or include a serial break signal. For example, commencement signal may be or include a RS-232 compliant break sequence from a BP 280. For instance, a BD 270 may detect serial break signal. In one or more embodiments, detecting a serial break signal may include receiving a signal from a BD 270. For example, logic 230 may receive a signal from a BD 270 if BD 270 detects the serial break signal. For instance, logic 230 may receive a signal from a BD 270 if BD 270 detects the serial break signal via coupling 290.

At 515, a first multiplexer may be configured to select a coupling associated with a backplane of the multiple backplanes. For example, MUX 250A may be configured to select a coupling 290 associated with a BP 280 of the multiple of BPs 280A-280C. In one instance, if a commencement signal was detected via coupling 290A, logic 230 may configure MUX 250A to select coupling 290A. In a second instance, if a commencement signal was detected via coupling 290B, logic 230 may configure MUX 250A to select coupling 290B. In another instance, if a commencement signal was detected via coupling 290C, logic 230 may configure MUX 250A to select coupling 290C.

At 520, first information may be provided to the backplane via a serial interface and the first multiplexer. For example, logic 230 may provide the first information to BP 280 via serial interface 240 and MUX 250A. In one instance, if MUX 250A is configured to select coupling 290A, logic 230 may provide the first information to BP 280A via serial interface 240 and MUX 250A. In a second instance, if MUX 250A is configured to select coupling 290B, logic 230 may provide the first information to BP 280B via serial interface 240 and MUX 250A. In another instance, if MUX 250A is configured to select coupling 290C, logic 230 may provide the first information to BP 280C via serial interface 240 and MUX 250A.

At 525, second information from the backplane may be received via the serial interface. In one example, the second information may be received via the first multiplexer and the serial interface. For instance, the second information may be received via MUX 250A and serial interface 240. In another example, the second information may be received via a second multiplexer and the serial interface. For instance, the second information may be received via MUX 250C and serial interface 240. In one or more embodiments, the second information may include configuration information associated the backplane. In one example, the configuration information associated the backplane may include configuration information associated with buses of the backplane. In a second example, the configuration information associated the backplane may include configuration information associated with one or more storage devices of the backplane. In another example, the configuration information associated the backplane may include an inventory associated with the backplane. For instance, the inventory associated with the backplane may include information associated with components of the backplane. In one or more embodiments, IHS 110 may include at least one serializer/deserializer port coupled to processor 120. For example, the at least one serializer/deserializer port may be configured based at least on the inventory associated with the backplane.

At 530, the second information from the backplane may be stored. For example, the second information may be stored via registers 260. In one instance, if the second information is from BP 280A, the second information may be stored via registers 260A. In a second instance, if the second information is from BP 280B, the second information may be stored via registers 260B. In another instance, if the second information is from BP 280C, the second information may be stored via registers 260C.

At 535, at least a portion of the second information may be provided to at least one of information handling system firmware, an operating system, and a boot management controller. For example, device 220 may provide at least a portion of the second information to at least one of IHSFW 172, OS 162, and BMC 185, among others. In one or more embodiments, method elements 515-535 may be performed for each backplane of the multiple backplanes. For example, method elements 515-535 may be performed for each backplane of the multiple backplanes in response to detecting the multiple commencement signals.

At 540, the operating system may be booted with the at least the portion of the second information associated with at least one of the multiple backplanes. For example OS 162 may be booted with the at least the portion of the second information associated with at least one of the multiple backplanes. In one or more embodiments, booting the operating system with the at least the portion of the second information associated with at least one of the multiple backplanes may provide one or more benefits. For example, the operating system may boot faster as the operating system may not have to inventory one or more backplanes. For instance, inventorying the one or more backplanes may include determining one or more devices of the one or more backplanes and/or determining one or more configurations of the one or more backplanes. In one or more embodiments, BMC 185 may provide the at least the portion of the second information associated with at least one of the multiple backplanes to OS 162. In one or more embodiments, IHSFW 172 may provide the at least the portion of the second information associated with at least one of the multiple backplanes to OS 162. For example, OS 162 may receive, via the at least one of the WMI and the CIM, the at least the portion of the second information associated with at least one of the multiple backplanes from IHSFW 172.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. An information handling system, comprising:
   at least one processor;
   a device coupled to the processor; and
   a memory medium coupled to the at least one processor;
   wherein the device includes a first multiplexer and a serial interface coupled to the first multiplexer;
   wherein the device is configured to:
      detect a plurality of commencement signals from a respective plurality of backplanes;

in response to detecting the plurality of commencement signals:
  for each backplane of the plurality of backplanes:
    configure the first multiplexer to select a coupling associated with the backplane;
    provide, via the serial interface and the first multiplexer, first information to the backplane;
    receive, via the serial interface, second information from the backplane;
    store the second information from the backplane; and
    provide at least a portion of the second information to at least one of information handling system firmware, an operating system, and a boot management controller; and
wherein the memory medium stores instructions executable by the at least one processor, which when executed by the at least one processor, cause the information handling system to:
  boot the operating system with the at least the portion of the second information associated with at least one of the plurality of backplanes.

2. The information handling system of claim 1, further comprising:
the boot management controller;
wherein the boot management controller is configured to provide the at least the portion of the second information associated with the at least one of the plurality of backplanes to the operating system.

3. The information handling system of claim 1,
wherein the operating system includes a management information exchange that includes at least one of a Windows Management Interface (WMI) and a Common Information Model (CIM);
wherein, to boot the operating system with the at least the portion of the second information associated with the at least one of the plurality of backplanes, the instructions further cause the information handling system to receive, via the at least one of the WMI and the CIM, the at least the portion of the second information associated with the at least one of the plurality of backplanes from the information handling system firmware.

4. The information handling system of claim 1, wherein the device includes at least one of complex programmable logic device, a programmable array logic, a field programmable gate array, and an application specific integrated circuit.

5. The information handling system of claim 1,
wherein the device includes a second multiplexer;
wherein the serial interface is coupled to the second multiplexer; and
wherein, to receive, via the serial interface, the second information from the backplane, the device is further configured to receive, via the second multiplexer, the second information from the backplane.

6. The information handling system of claim 1, wherein, to detect the plurality of commencement signals from the plurality of backplanes, the device is further configured to detect a plurality of RS-232 compliant break sequences from the plurality of backplanes.

7. The information handling system of claim 1, wherein the serial interface is compliant with a universal asynchronous receiver-transmitter.

8. The information handling system of claim 1,
wherein the at least the portion of the second information associated with the at least one of the plurality of backplanes includes configuration information associated with a plurality of buses of the at least one of the plurality of backplanes; and
wherein, to boot the operating system with the at least the portion of the second information associated with the at least one of the plurality of backplanes, the instructions further cause the information handling system to configure the operating system to utilize the configuration information associated with the plurality of buses of the at least one of the plurality of backplanes.

9. The information handling system of claim 1, wherein the device is further configured to:
configure the first multiplexer to select a coupling associated with a first backplane of the plurality of backplanes;
provide, via the serial interface and the first multiplexer, third information to the first backplane;
configure the first multiplexer to select a coupling associated with a second backplane of the plurality of backplanes; and
provide, via the serial interface and the first multiplexer, fourth information to the second backplane.

10. The information handling system of claim 1, wherein the second information from the backplane includes an inventory associated with the backplane.

11. The information handling system of claim 6,
wherein the device further includes a plurality of break detectors that are configured to detect the plurality of RS-232 compliant break sequences; and
wherein, to detect the plurality of commencement signals from the plurality of backplanes, the device is further configured to receive a plurality of signals from the plurality of break detectors.

12. The information handling system of claim 9,
wherein the first backplane and the second backplane are associated with a storage array;
wherein the third information indicates that the first backplane will produce light emissions associated with a storage device of the first backplane; and
wherein the fourth information indicates that the second backplane will produce light emissions associated with a storage device of the second backplane.

13. The information handling system of claim 12, further comprising:
at least one serializer/deserializer port coupled to the at least one processor;
wherein the instructions further cause the information handling system to configure the at least one serializer/deserializer port based at least on the inventory associated with the backplane.

14. A method, comprising:
detecting a plurality of commencement signals from a respective plurality of backplanes;
for each backplane of the plurality of backplanes:
  configuring a first multiplexer to select a coupling associated with the backplane;
  providing, via a serial interface and the first multiplexer, first information to the backplane;
  receiving, via the serial interface, second information from the backplane;
  storing the second information from the backplane; and
  providing at least a portion of the second information to at least one of information handling system firmware, an operating system, and a boot management controller; and booting the operating system with the at least the portion of the second information associated with at least one of the plurality of backplanes.

15. The method of claim 14, further comprising:
the boot management controller providing the at least the portion of the second information associated with the at least one of the plurality of backplanes to the operating system.

16. The method of claim 14, wherein the detecting the plurality of commencement signals from the plurality of backplanes includes detecting a plurality of RS-232 compliant break sequences from the plurality of backplanes.

17. A programmable logic device, configured to:
implement a serial interface and a first multiplexer;
detect a plurality of commencement signals from a respective plurality of backplanes;
in response to detecting the plurality of commencement signals:
for each backplane of the plurality of backplanes:
configure the first multiplexer to select a coupling associated with the backplane;
provide, via the serial interface and the first multiplexer, first information to the backplane;
receive, via the serial interface, second information from the backplane;
store the second information from the backplane; and
provide at least a portion of the second information to at least one of information handling system firmware, an operating system, and a boot management controller.

18. The programmable logic device of claim 17, wherein, to detect the plurality of commencement signals from the plurality of backplanes, the programmable logic device is further configured to detect a plurality of RS-232 compliant break sequences from the plurality of backplanes.

19. The programmable logic device of claim 18,
wherein the programmable logic device is further configured to implement a plurality of break detectors that are configured detect the plurality of RS-232 compliant break sequences; and
wherein, to detect the plurality of commencement signals from the plurality of backplanes, the programmable logic device is further configured to receive a plurality of signals from the plurality of break detectors.

20. The programmable logic device of claim 17,
wherein the programmable logic device is further configured to implement a second multiplexer; and
wherein, to receive, via the serial interface, the second information from the backplane, the programmable logic device is further configured to receive, via the second multiplexer, the second information from the backplane.

* * * * *